(12) United States Patent
Janik

(10) Patent No.: US 6,506,302 B2
(45) Date of Patent: Jan. 14, 2003

(54) KEY SYSTEM FOR ECOLOGICAL FILTER CARTRIDGE AND ELEMENT

(75) Inventor: Leon P. Janik, Suffield, CT (US)

(73) Assignee: Stanadyne Corporation, Windsor, CT (US)

(*) Notice: Subject to any disclaimer, the term of this patent is extended or adjusted under 35 U.S.C. 154(b) by 0 days.

(21) Appl. No.: 09/784,956

(22) Filed: Feb. 16, 2001

(65) Prior Publication Data

US 2001/0042709 A1 Nov. 22, 2001

Related U.S. Application Data (60) Provisional application No. 60/182,993, filed on Feb. 16, 2000.

(51) Int. Cl.[7] .............................................. B01D 35/30
(52) U.S. Cl. ...................... 210/232; 210/438; 210/440; 210/444; 210/450; 210/454; 210/497.01
(58) Field of Search ................................. 210/438, 440, 210/443, 444, 450, 454, DIG. 17, 232, 493.2, 497.01; 215/330

(56) References Cited

U.S. PATENT DOCUMENTS

| | | | | |
|---|---|---|---|---|
| 4,289,248 A | * | 9/1981 | Lynn ............................ | 215/307 |
| 4,976,852 A | * | 12/1990 | Janik et al. ................... | 210/181 |
| 5,186,829 A | * | 2/1993 | Janik ............................ | 210/232 |
| 5,203,994 A | * | 4/1993 | Janik ............................ | 210/232 |
| 5,259,953 A | * | 11/1993 | Baracchi et al. .............. | 210/232 |
| 5,770,065 A | * | 6/1998 | Popoff et al. ................. | 210/232 |

* cited by examiner

*Primary Examiner*—Matthew O. Savage
(74) *Attorney, Agent, or Firm*—Alix, Yale & Ristas, LLP (57) ABSTRACT

A fuel filter cartridge assembly employs a two piece housing to house a replaceable filter unit. The filter cartridge assembly incorporates a key system to ensure compatibility of a replacement filter unit for a given cartridge assembly. Keys formed on the filter unit cooperate with keyways formed in the housing to ensure that only filter units having key structures may be used. Each key may have a different angular position, angular dimension and radial projection. By varying the dimensions of the keys and/or the positions and/or the number of keys, a composite compatibility matrix comprising an infinite number of configuration sets are available to differentiate between filter units having differing flow capacities, filter media, disposal options or other characteristics.

4 Claims, 8 Drawing Sheets

KEY SYSTEM FOR ECOLOGICAL FILTER CARTRIDGE AND ELEMENT

REFERENCE TO RELATED APPLICATION

This application claims the benefit of U.S. Provisional Application No. 60/182,993, filed Feb. 16, 2000.

BACKGROUND OF THE INVENTION

This invention relates generally to fuel filters employed in connection with internal combustion engines. More particularly, the present invention relates to fuel filter systems having a replaceable cartridge for removing foreign particles and/or separating water from fuel of the fuel supply system of an internal combustion engine.

It has long been recognized that trouble-free operation of an internal combustion engine requires some form of filtering of the fuel consumed by the engine. In particular, the absence of high standards of quality control in diesel fuel supplies dictates that an effective fuel filter be incorporated into the fuel supply system for a diesel engine. It is not uncommon for diesel fuel to contain significant quantities of abrasive particles and water. The abrasive particles present the potential for permanent damage to components of the fuel injection pump. The abrasive particles can also adversely effect the performance of the pump by destroying the ability of the fuel injection pump to precisely meter and deliver fuel at high pressures. The presence of water in the diesel fuel supply can cause rusting of engine components, and during freezing conditions, can result in interruption of the fuel injection system and/or seizure of moving components.

A number of conventional fuel filter systems perform the dual functions of removing particulate matter from the diesel fuel and separating water from the fuel. Conventionally, the fuel filter systems employ a disposable filter cartridge which is replaced at pre-established intervals of filter usage. In practice the filter cartridge requirements may vary depending upon such characteristics as the type and make of the internal combustion engine, the specific applications for which the engine is employed, the climate in which the combustion engine is operated and/or regional characteristics as to the quality of the fuel supply. The filter cartridges thus commonly vary as to their dimensions, their capacity, and the qualities of their filter media.

One of the problems which is frequently encountered in connection with replacement of the filter cartridge is ensuring that the replaced cartridge is compatible with the filtering requirements for the fuel system. Because numerous types and qualities of filter cartridges may dimensionally conform to the base of a given filter system, the replacement filter cartridge frequently does not comply with the specifications for the filter system, thereby jeopardizing the integrity of the fuel filtering system. Use of an incompatible filter cartridge can have very serious effects on the operation of the internal combustion engine, and may also be unnecessarily expensive when a less costly cartridge is fully suitable. Frequently, either the owner or the maintenance personnel servicing the internal combustion engine are totally unaware of the replacement filter cartridge specifications and requirements and unknowingly jeopardize the integrity of the filtering system by using non-conforming filter cartridges. There are also instances where inferior or improper replacement filter cartridges are intentionally installed without the knowledge of the owner or operator of the vehicle.

U.S. Pat. No. 5,035,797, which is assigned to the assignee of the present invention, discloses a key system for a filter system intended to address issues of filter cartridge compatibility. Fuel filter systems commonly comprise fuel inlet and outlets disposed in a base and a disposable filter cartridge which mounts to the base. Disposable filter cartridges constructed according to this invention have slots which are designed to mate with axial projections of the base. The projections interfere with the use of an incompatible cartridge by interfering with the mounting and sealing of the cartridge to the base.

Fuel filters have typically been constructed in the form of a metal can, permanently enclosing the filter element in a single use assembly. While these assemblies have proved to be effective and reliable, they are less than ideal in terms of waste of materials and disposal cost.

Increased awareness of environmental protection and recycling of materials have led to a need for more efficient filtration systems having a minimum disposable component. In addition, environmental protection agencies seeking to reduce the volume of waste items associated with the automotive and trucking industries may no longer permit unrestricted disposal of used fuel filters into the normal waste stream, thereby necessitating specialized and consequently more expensive disposal.

SUMMARY OF THE INVENTION

Briefly stated, the invention in a preferred form is a filter cartridge assembly including a two-part housing and replaceable filter unit wherein the assembly incorporates a key system for keying the replaceable filter unit to the cartridge.

The housing is constructed of first and second cooperative sections, detachably connected to allow replacement of the used filter unit. In one embodiment, each housing section is can-shaped, having a closed first end and an open second end. The filter unit includes a continuous, fan shaped, pleated filter element, typically composed of a form of paper. Axially spaced first and second end caps provide support structure for the filter element and also provide a platform for the attachment of grommets which seal the unit to the fuel inlet/outlet conduit.

In a preferred form of the key system, at least one tab or key radially projects from either the housing first section or the filter unit first end cap. A corresponding keyway in either the other housing first section or the filter unit first end cap is dimensioned and located for receiving the corresponding key. The keyway in the housing first section takes the form of a slot having an axial portion and an offset portion generally perpendicular to the axial portion. The filter unit is guided into the housing first section axially along the cooperative keyway and key structure. The first end cap includes a radially inward projecting shoulder which, during insertion, rides over radially outward projecting ribs on the housing grommet. The ribs engage the shoulder so that the filter unit is held axially within the housing first section. In this manner the filter unit is captured and retained by the housing first section.

The cooperative keyway and key structures function as a key system to prevent the use of incompatible filter units in a particular housing. For a compatible filter unit, the angular dimension of the key will be matched by the arcuate extent of the axial portion of the keyway, and the axial dimension of the offset portion of the keyway will match the axial dimension of the key. A filter unit having a key with an incorrect angular dimension will not be accepted in the axial portion of the keyway defined by the housing first section. A filter unit having a key with an incorrect axial dimension will not properly engage the offset portion of the keyway.

In a preferred embodiment, the keys project radially from the filter unit first end cap and have radial and angular dimensions complementary with the corresponding radial depth and arcuate extent of the keyway defined by the housing first section. The filter unit key is accepted in the axial portion of the keyway, the filter unit is guided into mating position within the housing first section. The housing second section is then connected to the housing first section to form a sealed enclosure surrounding the filter unit.

The assembled housing and filter unit form a filter cartridge assembly which can be used to replace conventional, sealed filter cartridges in fuel filter systems and other applications. The key system ensures replacement filter unit compatibility for various filter cartridges having common dimensions. Unique sets of keys and keyways may be selected to form a composite compatibility matrix for each desired filter unit capacity, filter media or other characteristic, including compliance with ecological regulations or manufacturer specifications.

An object of the invention is to provide a new and improved filter cartridge assembly incorporating a system to key the replaceable filter unit to the housing.

Another object of the invention is to provide a new and improved filter cartridge assembly which allows replacement of the filter unit and provides a key system which ensures only compatible units will be used.

A further object of the invention is to provide a new and improved filter cartridge assembly key system wherein the filter unit is captured within the housing in particular axial position.

Other objects and advantages of the invention will become apparent from the drawings and the specification.

DETAILED DESCRIPTION OF THE PREFERRED EMBODIMENT

With reference to the drawings wherein like numerals represent like parts throughout the several figures, a filter cartridge assembly in accordance with the present invention is generally designated by the numeral 10. Filter cartridge assembly 10 includes first and second detachably connectable sections which retain and surround a filter unit 30. The filter unit 30 has a defined useful life and is periodically replaced with a compatible filter unit. The filter cartridge assembly 10 is especially adapted for incorporation into the fuel filter system of an internal combustion engine (not illustrated) such as a diesel engine. The filter cartridge assembly is intended to reduce waste by allowing replacement of only the spent filter unit, rather than the entire cartridge.

In addition, the filter unit is constructed of materials which allow disposal by incineration.

It should be appreciated that the present invention is not limited to any specific filter cartridge assembly, but is generally applicable to any filter cartridge assembly employing a housing which may be disassembled to allow replacement of a spent filter unit retained therein.

Figure 1:
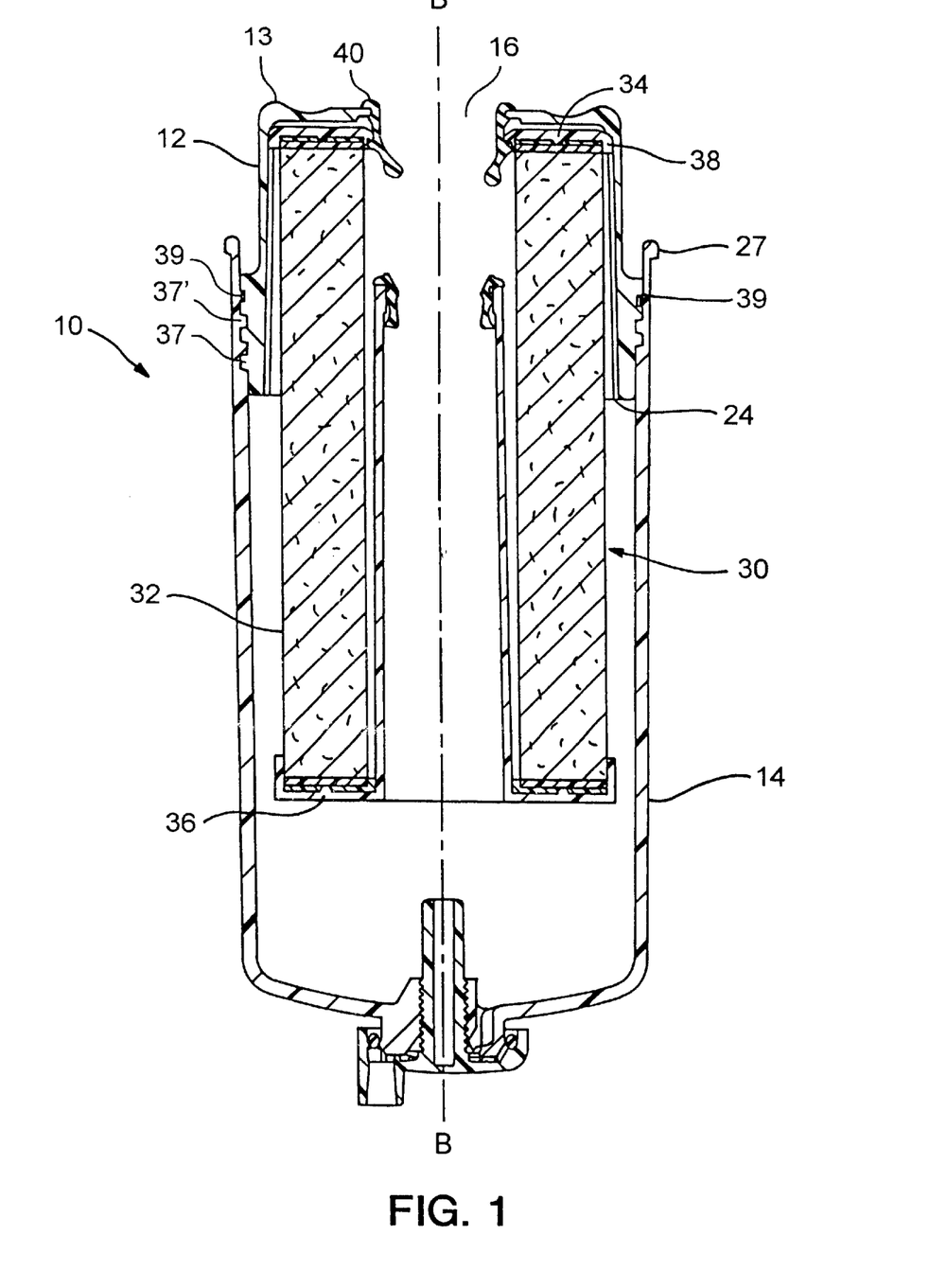
FIG. 1 is a cross sectional view of a filter cartridge assembly incorporating a key system in accordance with the present invention.
Figure 2:
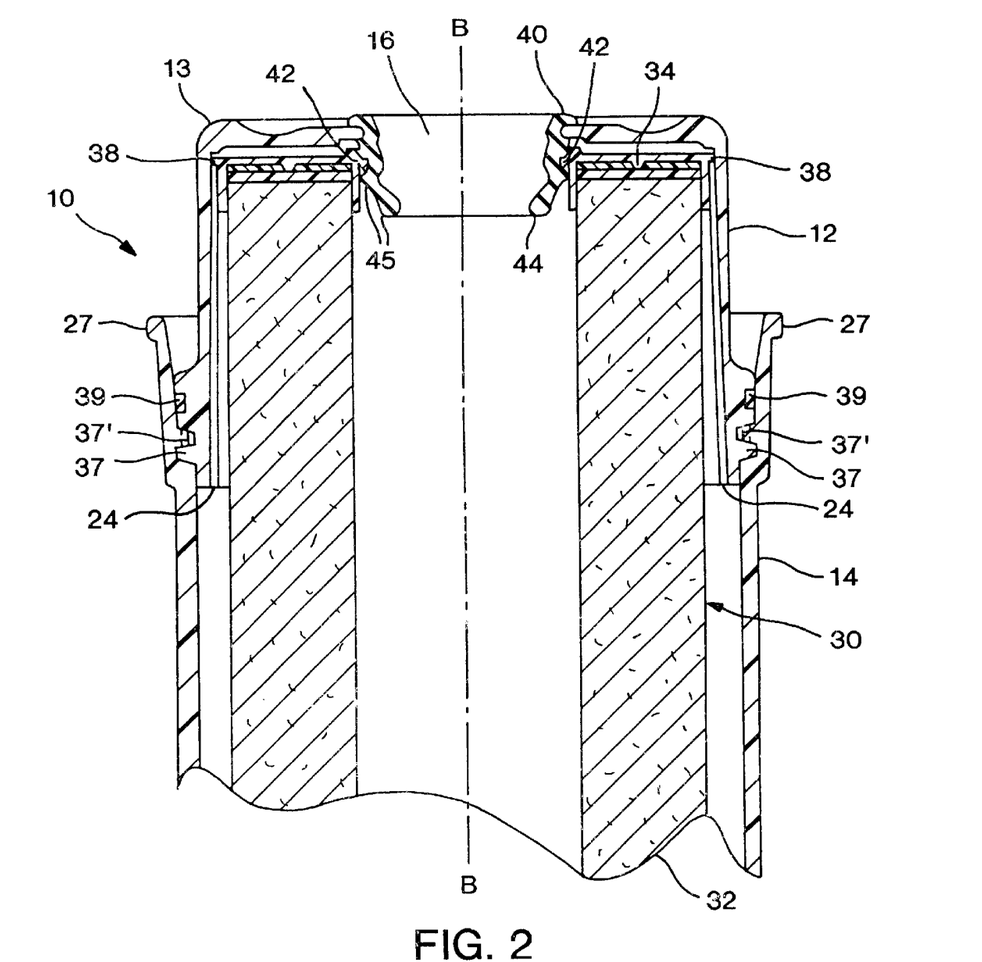
FIG. 2 is an enlarged fragmentary cross sectional view of the filter cartridge assembly of FIG. 1.
Figure 13:
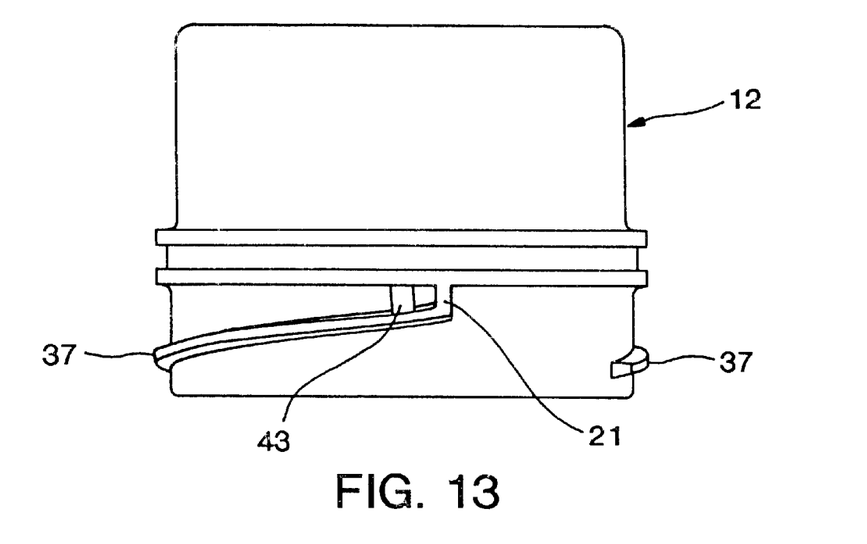
FIG. 13 is an exterior view of the housing first section of 3 and 4.
Figure 14:
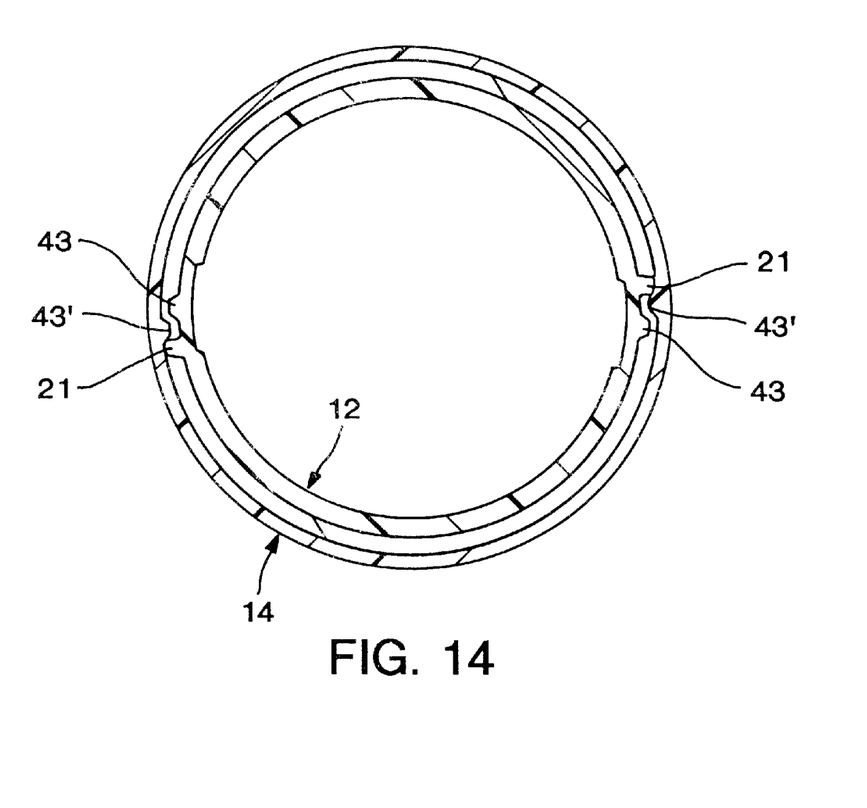
FIG. 14 is a cross-sectional view through an assembled filter cartridge assembly housing in accordance with the present invention.

As illustrated in FIGS. 1 and 2, a filter cartridge assembly 10 in accordance with the present invention includes a housing first section 12 and a cooperative second section 14 which are detachably connectable to form a fluid tight enclosure. A threaded connection between the housing sections is illustrated. Complementary threads 37, 37' project from the housing first and second sections, respectively. With reference to FIGS. 13 and 14, each housing section 12, 14 includes a retainer bump 43, 43" located so that the housing sections must deform to permit one bump to ride over the other as the housing sections rotate relative to each other. The housing first section 12 includes a stop 21 arranged to define the fully engaged position of the threaded connection. Retaining bump 43' rides over retaining bump 43 and then encounters the stop 21. In practice, this arrangement results in a positive "snap" indicating a fully engaged position. Additionally, the housing unit sections are retained in a fixed relationship relative to each other until the retaining bumps are disengaged.

A filter unit 30 is captured and retained within the enclosure by the housing first section 12. The filter unit 30 includes a generally continuous filter element 32, a first end cap 34 and a second end cap 36. The end caps 34, 36 enclose the axially spaced ends of the filter element 32 and provide structure to the paper element. The peripheral portion 35 of the first end cap 34 includes radially extending keys 38 configured to engage axial portions 24 of the keyway defined by the interior structure 26 of the housing first section 12. In a typical embodiment of a filter unit 30 for use in a filter system having a standard flow path, the second end cap 36 includes a tubular axial projection extending toward the first end cap 34. The tubular projection terminates in a structure configured to engage and retain a sealing grommet. The first end cap 34 includes a radially inward extending shoulder 42 defining a central opening 46 configured for receiving an axially extending tubular portion 44 of the housing grommet 40. In an installed position within the housing first end 12, the radially inwardly projecting shoulder 42 of the first end cap 34 engages the axially extending tubular portion 44 of the housing grommet 40. The radially extending shoulder 42 is axially positioned to engage an intermediate portion of the housing grommet 40, exerting a radially inward force on that intermediate portion.

The tubular grommet 40 includes at least one radially protuding rib 45. The inward projecting shoulder 42 rides over the ribs 45 during installation. When the keys 38 are fully received in the axial portion 24 of the keyway at the extreme (top) thereof. The filter unit is retained in this axial position by the engaged relationship between the grommet rib 45 and the inward projecting shoulder. This engaged relationship is further enhanced when the filter cartridge assembly is inserted into a base module, as best seen in FIG. 10.

Figure 10:
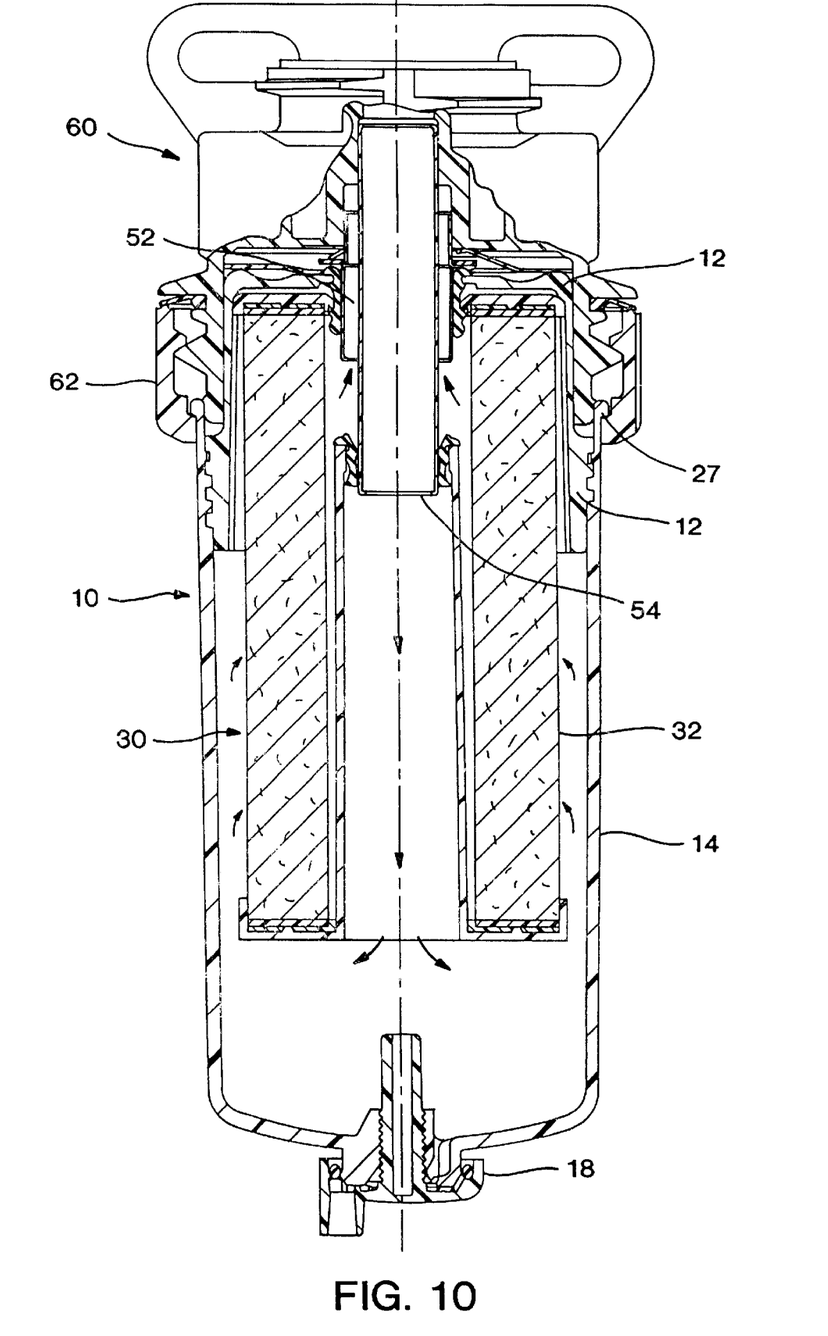
FIG. 10 is a cross sectional view of the filter cartridge assembly of FIG. 1 mounted to a filter base module.

A fuel filter system for which the filter cartridge assembly 10 of the present invention is particularly suited is illustrated in FIG. 10. A filter base module 60 forms a receptacle for receiving the filter cartridge assembly 10. A coaxial fuel inlet/outlet conduit projects from the filter base module 60 into the filter cartridge assembly 10 through a central opening 16 in the housing first section 12. The fuel inlet/outlet conduit includes an inlet conduit 54 surrounded by a coaxial outlet conduit 52.

The housing grommet 40 surrounds and seals the housing first end 12 to the outlet conduit 52.

FIG. 10 illustrates a base module 60 and associated filter cartridge assembly 10 adapted for a standard flow path of fuel through the filter element 32. In this configuration, the greater axial length of the fuel inlet conduit 54 provides an end location which is engaged by a grommet retained on the tubular axial projection of the filter unit second end cap 36. The sealed engagement between the fuel inlet conduit 54 and the tubular axial projection forms a fuel inlet path directing fuel axially into the housing second section 14 where it flows radially and axially to the filter element 32 in the general direction of the FIG. 10 arrows. Passing radially through the filter element 32, the filtered fuel then flows generally axially into the fuel outlet conduit 52.

A threaded collar 62 passes over the filter cartridge assembly 10 and engages a molded lip structure 27 extending from the housing second section 14. The collar 62 threadably engages complementary threads on the filter base module 60, retaining the filter cartridge assembly 10 in a stable mated position with the filter base module 60. The base module 60 and collar 62 prevent the housing sections 12, 14 from deforming and make it impossible for the two housing sections 12, 14 to disengage from each other.

The portion of a base module 60 which receives and mates with the filter cartridge assembly 10 will typically have a standard configuration. As a result, the external configuration of the first end 13 of a filter cartridge assembly adapted to mate with the filter base module 60 will be generally similar. While the size and configuration of the filter base module may be standardized, such base modules are compatible with applications requiring different filtering and flow capabilities. In addition, the internal configuration of the filter cartridge assembly, i.e., the filter unit 30, may differ significantly.

To preserve the integrity of the filtration system, it is essential that only compatible filter units, including filter units which satisfy ecological standards, be installed within the filter cartridge assembly for a particular application. Only a compatible filter unit will have the correct disposal characteristics, filter media, flow path, capacity and internal configuration for a particular application. The present invention ensures that only compatible filter units 30 may be installed by providing cooperative keyway and key structures on the housing first section 12 and the filter unit 30 to thereby key the filter unit to the housing.

Figure 3:
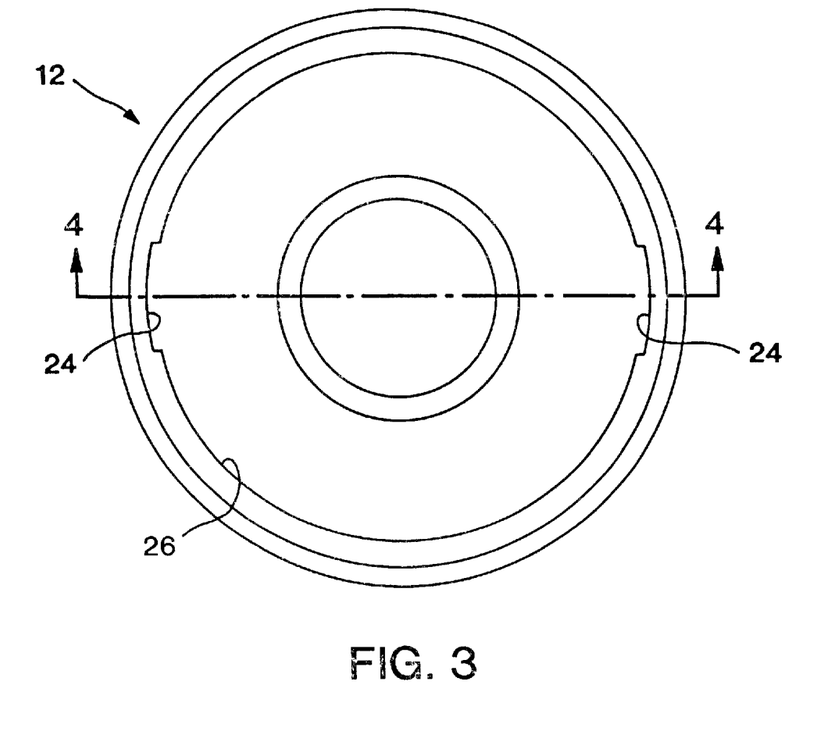
FIG. 3 is a bottom plan view of a filter cartridge assembly housing first section in accordance with the present invention.
Figure 4:
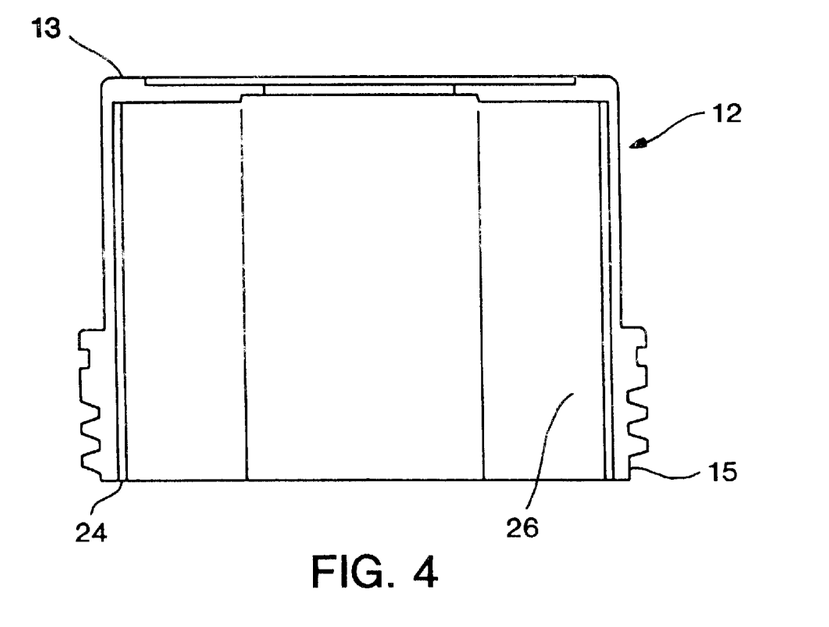
FIG. 4 is a cross sectional view of the filter cartridge housing first section of FIG. 3 taken along line 4—4 thereof.

FIGS. 3 and 4 illustrate the configuration of the housing first section 12. The interior structure 26 of the housing first section 12 defines keyways, the axial portions 24 of which extend from the housing first section 12 second end 15 toward the first end 13.

Figure 5:
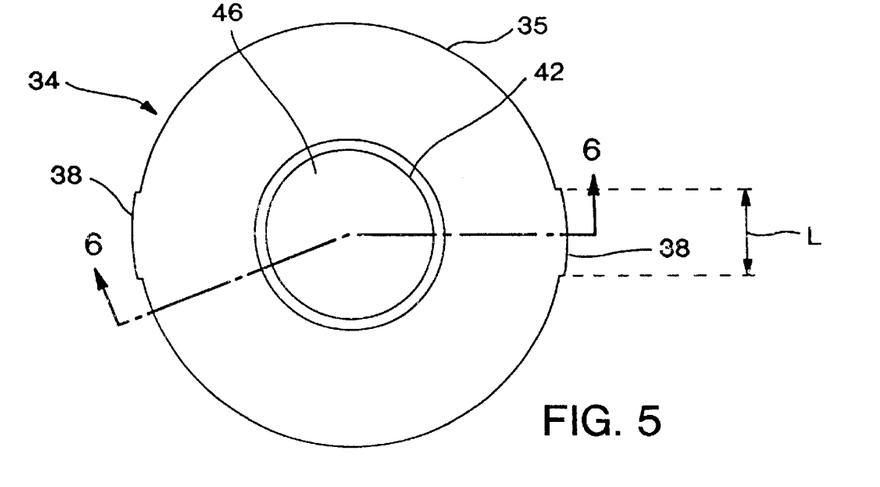
FIG. 5 is a top plan view of a filter unit end cap in accordance with the present invention.
Figure 6:
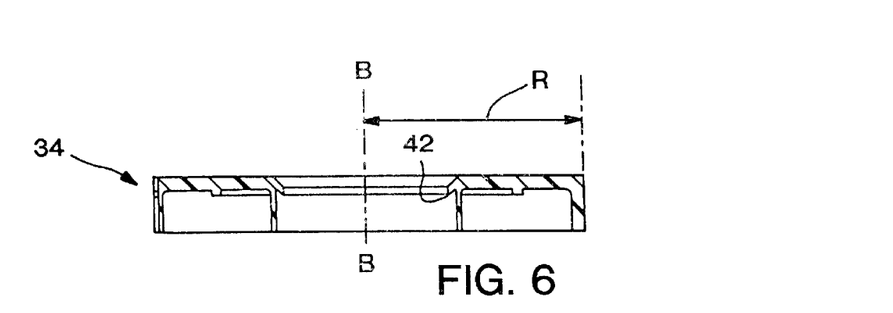
FIG. 6 is a cross sectional view of the filter unit end cap of FIG. 5 taken along the line 6—6 thereof.
Figure 7:
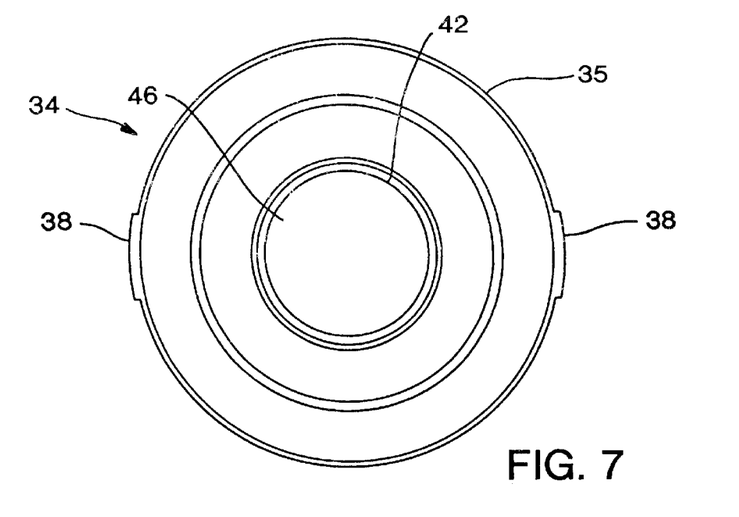
FIG. 7 is a bottom plan view of the filter unit end cap of FIG. 5.

FIGS. 5–7 illustrate the complementary structure of the filter unit first end cap 34. The filter unit first end cap 34 has a generally circular peripheral portion 35 which includes radially extending keys 38. The keys 38 extend from the first end cap 34 in at least two dimensions to define a compatibility matrix for the filter unit. The compatibility matrix may be further described by the key geometry as follows:

Each key 38 subtends an angle, producing an angular dimension L which is measured along the peripheral portion 35; and Each key projects a radial distance R from a central axis B.

The embodiment illustrated in FIGS. 3–7 illustrates a housing first section 12 interior structure 26 which defines two equal size, equal depth, keyway axial portions 24. The illustrated first end cap 34 includes two keys having equal angular dimensions L, projecting equal radial distances R. The structure of the keys 38 illustrated in FIGS. 5–7 is complementary to and cooperative with the structure of the keyway axial portions 24, illustrated in FIGS. 3 and 4.

To assemble the filter cartridge, the keys 38 are aligned with and received in the keyway axial portions 24 allowing the filter unit 30 to be inserted into the housing first section 12. When the filter unit 30 is fully inserted (positioned at the top of the keyway), the radially inward projecting shoulder 42 is engaged with the tubular portion of the housing grommet 40. In this manner, the filter unit 30 is captured and retained in a particular axial position within the housing first section 12. To be fully inserted and captured, the key structure of a filter unit must have the correct number of keys in the correct angular positions, each key having the correct geometry, e.g., the correct radial and angular dimensions. Only when a correctly configured filter unit has been fully received and retained may the housing second section 14 be threadably engaged with the housing first section to form a sealed filter cartridge assembly for use in conjunction with a base module 60.

Figure 8:
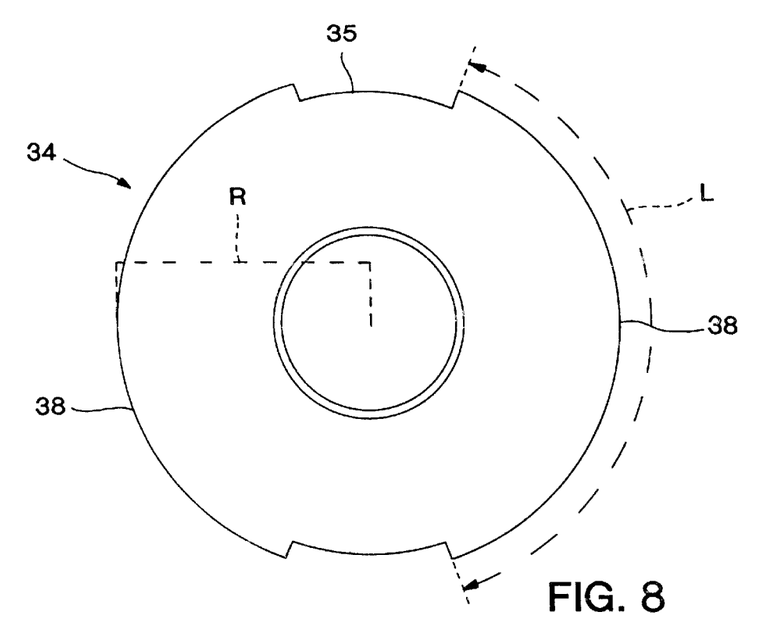
FIG. 8 is a top plan view of a filter unit end cap incorporating an alternative key configuration in accordance with the present invention.
Figure 9:
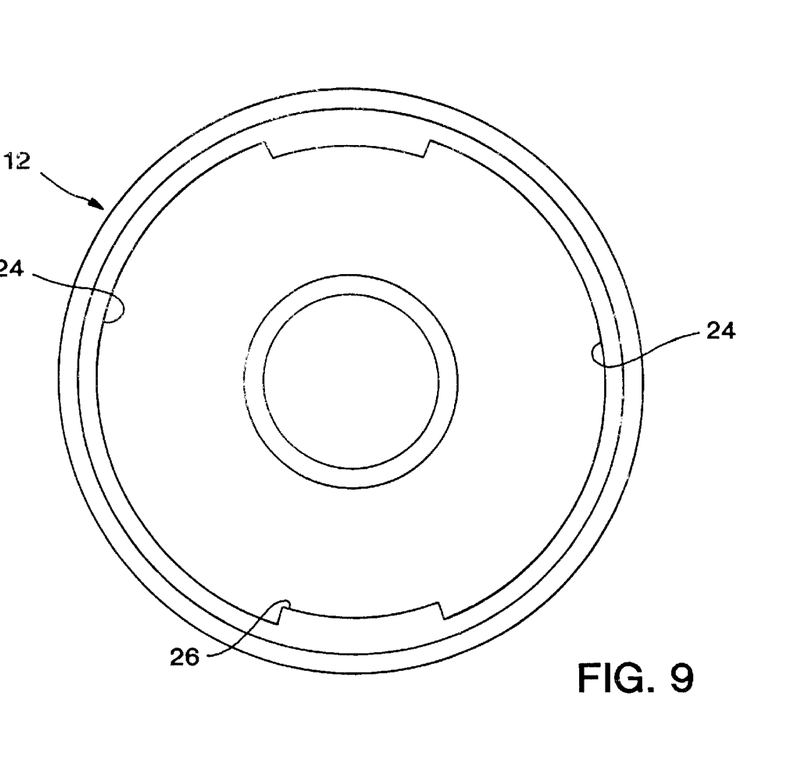
FIG. 9 is a bottom plan view, partly in phantom, of a filter cartridge assembly housing first section incorporating an alternative configuration in accordance with the present invention.

FIGS. 8 and 9 illustrate a configuration which varies the angular dimension L of the keys 38. FIG. 8 illustrates a first end cap 34 where each key 38 subtends an obtuse angle of approximately 140°. Each key 38 has an equivalent radial projection R. FIG. 9 illustrates a bottom view of a housing first section 12 configured to receive the first end cap 34 illustrated in FIG. 8. The interior structure 26 defines keyway axial portions 24 which extend most of the way around one-half of the interior structure 26.

Figure 11:
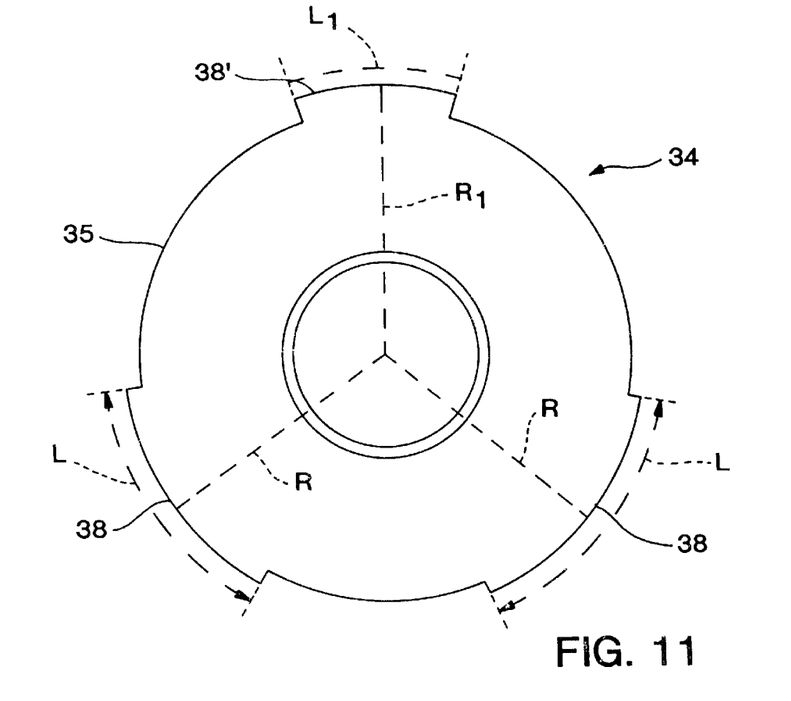
FIG. 11 is a top plan view of a filter unit end cap incorporating an alternative key configuration in accordance with the present invention.
Figure 12:
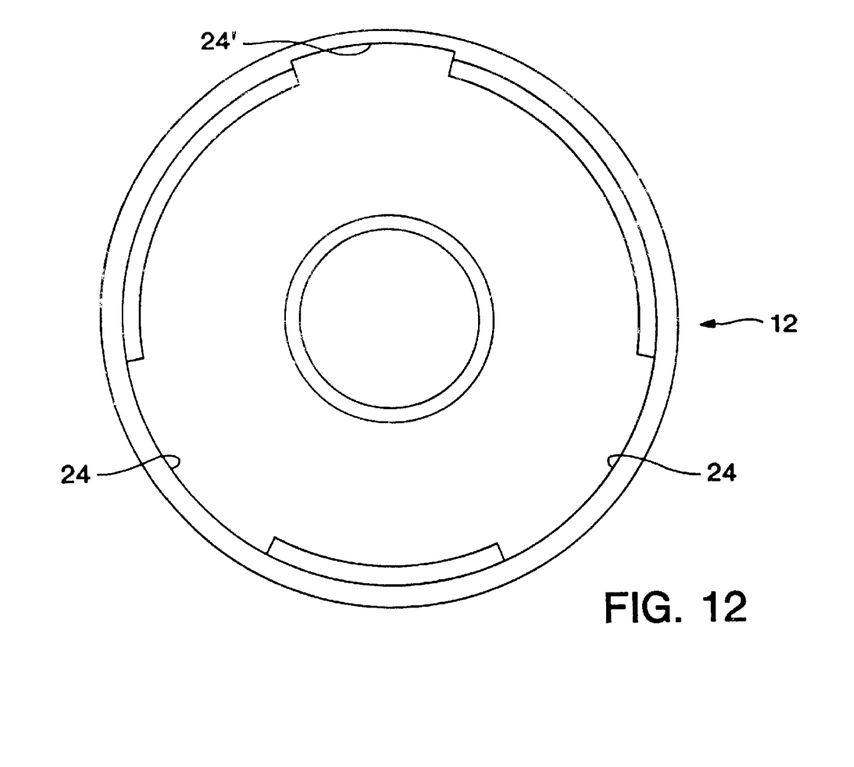
FIG. 12 is a bottom plan view, partly in phantom, of a filter cartridge assembly housing first section incorporating an alternative configuration in accordance with the present invention.

FIGS. 11 and 12 illustrate a further alternative configuration of keys and keyways in accordance with the present invention. FIG. 11 is a top plan view of a filter unit first end cap 34 having three radially projecting keys 38, 38'. Two of the three keys 38 have equal angular dimensions L and project equivalent radial distances R, while one key 38' projects a greater radial distance $R_1$ and has a smaller angular dimension $L_1$. FIG. 12 illustrates a housing first section 12 with compatibly configured keyway axial portions 24, 24'. By varying the radial and angular dimensions of the keys 38 and/or the positions and/or the number of keys

38, a composite compatibility matrix comprising an infinite number of configuration sets are available to differentiate between filter units 30 having differing flow capacities, filter media, disposal options, ecological qualities or other characteristics.

According to the present invention, the matching key and keyway structures define compatible housings and filter units. The key and keyway structures are positioned and configured so that incompatible housings and filter units cannot be readily assembled. For example, an incorrectly keyed filter unit will not be properly received in the housing first section, thus obstructing connection of the first and second housing sections. Requiring compatibility of the keys and keyways renders any attempt to defeat the key system highly problematical.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and scope of the present invention.

What is claimed is:

1. A filter cartridge assembly comprising:

a housing including a first section having a first end and a second section, said sections removably connectable to form a fluid-tight enclosure, said first section comprising an interior structure defining a plurality of keyways, each of said keyways comprising an axially extending slot having a radial depth and an arcuate exent, and a filter unit replaceably receivable in said enclosure, said filter unit including a filter element and at least one end cap enclosing an axial end of said filter element, said end cap including a peripheral portion having a plurality of keys extending radially from said peripheral portion, each of said keys extending a radial distance and subtending an angle complementary to the radial depth and arcuate extent of at least one of said plurality of keyways, wherein at least one of said plurality of keyways has a radial depth or arcuate extent different from a corresponding radial depth or arcuate extent of at least one other of said plurality of keyways, said plurality of keys including a key that projects a radial distance or subtends an angle complementary to said at least one of said plurality of keyways to define a key matrix indexing said filter element to the interior structure of said first section and said keys are receivable in said keyways and axially movable toward said first section first end.

2. A filter cartridge housing comprising:

a can-shaped first section including a central axis, a first end including an opening for the admission of fluid to be filtered and a threaded second end and an interior structure defining a plurality of keyways, each of said keyways comprising an axially extending slot having a radial depth and an arcuate extent, and a second section including a first end and a threaded second end, wherein said second ends are detachably threadably connectable to form a fluid tight enclosure surrounding a generally cylindrical internal chamber and at least one of said plurality of keyways has a radial depth or arcuate extent different from a corresponding radial depth or arcuate extent of at least one other of said keyways.

3. The filter cartridge housing of claim 2, wherein said housing sections are threadably connectable and each of said first and second housing sections includes a retainer bump positioned so that said bumps must ride over each other to complete the threaded connection between said first and second housing sections.

4. A filter unit comprising:

a filter element having axially spaced ends and surrounding a central axis, and an end cap enclosing an axial end of said element, said end cap including a generally arcuate peripheral portion without a circumferential roll seam, said peripheral portion having a center of curvature on said central axis and having a plurality of keys extending from the peripheral portion of said end cap, each of said keys projecting a radial distance and subtending an angle and having an arcuate outer periphery with a center of curvature on said central axis, wherein at least one of said plurality of keys extends a radial distance or subtends an angle that differs from a corresponding radial distance or angular extent of at least one other of said plurality of keys.

* * * * *